March 10, 1942.  F. HAMACHEK, JR  2,275,959
PEA SEPARATING APPARATUS
Filed Sept. 25, 1939
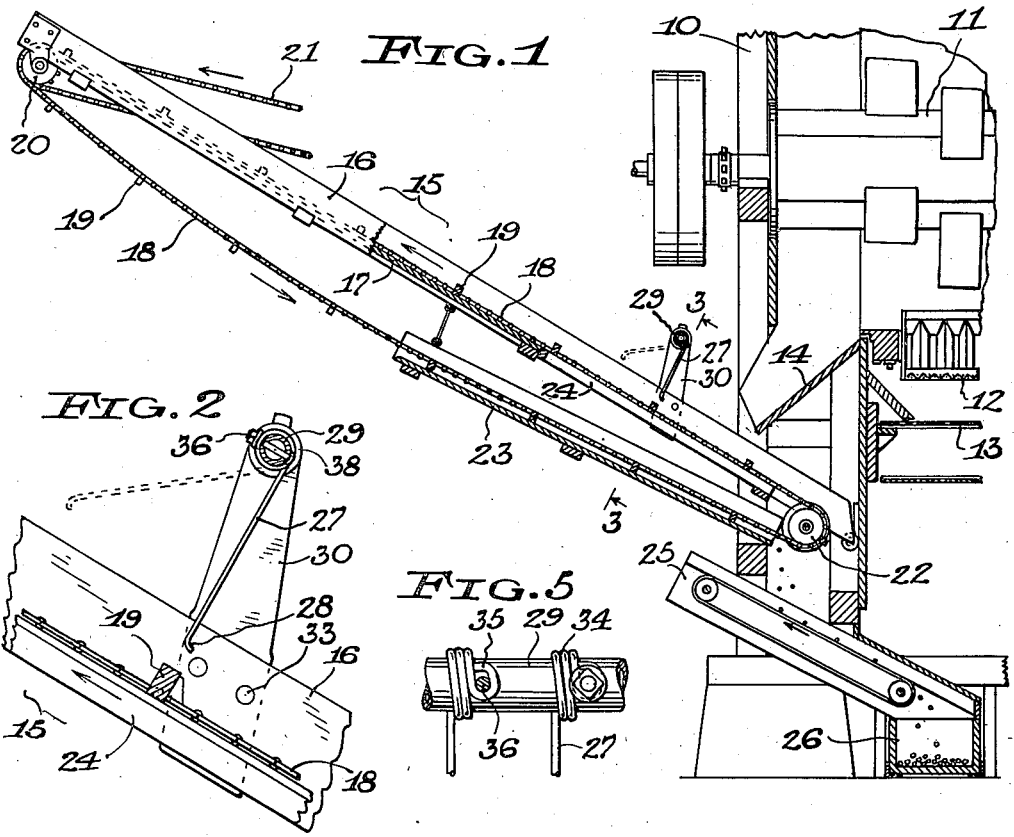
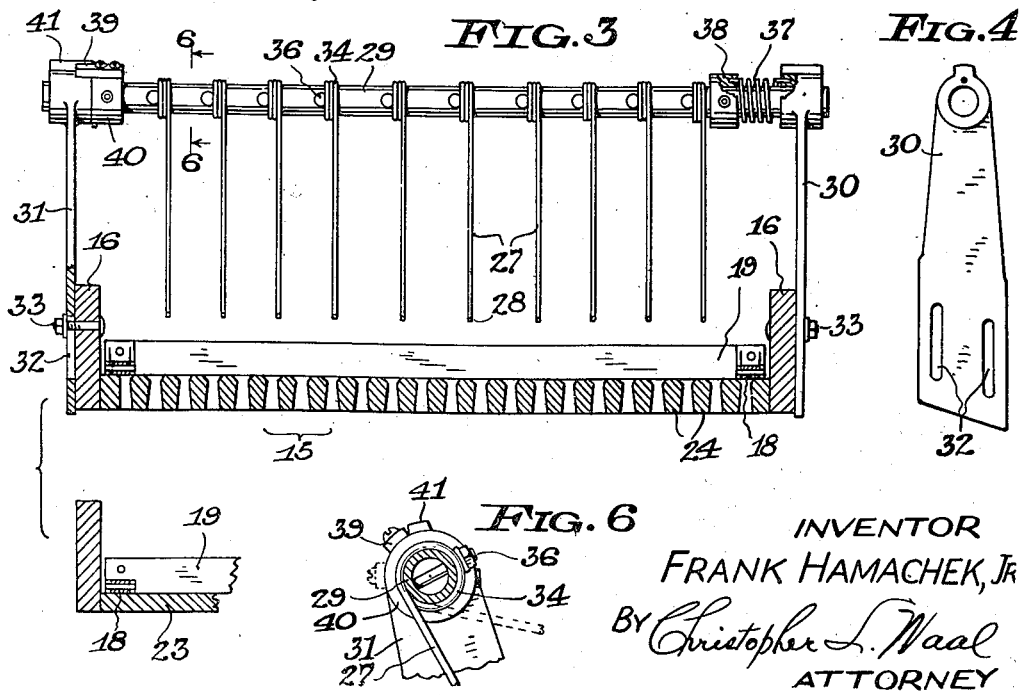
INVENTOR
FRANK HAMACHEK, Jr.
BY Christopher L. Waal
ATTORNEY Patented Mar. 10, 1942

2,275,959

UNITED STATES PATENT OFFICE 2,275,959

PEA SEPARATING APPARATUS

Frank Hamachek, Jr., Kewaunee, Wis., assignor to Frank Hamachek Machine Company, Kewaunee, Wis., a corporation of Wisconsin.

Application September 25, 1939, Serial No. 296,384

5 Claims. (Cl. 209—358)

This invention relates to apparatus for separating loose peas, beans or the like from vine material or straw after threshing.

The successful canning of peas and lima beans requires that threshing be done when they reach the proper stage of maturity, at which time the vines are usually green and juicy. As a pea crop may change to a lower grade in the course of a few hours, it is necessary to continue the threshing even during rain and wet weather.

Threshing is usually done by the impact method in which vines are fed through the rotatable screen drum of a viner or huller and are subjected therein to the blows of rotating beaters to cause the pods to break and liberate the peas. The drum has the usual lifting ribs at its inner side to raise the vines and drop them onto the beaters, and the beaters are carried on a shaft located approximately coaxially of the drum. Most of the liberated peas pass out through the meshes of the screen drum and are collected in the usual manner.

In the hulling operation the vines have a tendency to accumulate in bunches or mats, especially when the vines are green, juicy or wet. The peas liberated during the hulling operation are thrown in all directions by the beaters, and some of the peas fall onto the vines as they pass from the discharge end of the screen drum, or are caught in bunches or mats of the vines. These bunches or mats contain not only pea vines proper but also grasses and weeds which are mowed when the peas are harvested.

It has been found impractical to provide satisfactory means for separating the bunched vines at the discharge end of the screen drum, because of tangling around shafts and other parts and because of danger of clogging the machine.

The importance of salvaging or gleaning the threshed peas from the bunched or matted vine material passing out of the discharge end of the viner has heretofore been recognized, and while various constructions have been devised for this purpose they have been of relatively complicated character and have not been entirely satisfactory, especially when operating on green, juicy and wet vines.

It is an object of the present invention to provide improved but simplified apparatus which will efficiently separate or recover loose peas carried by the vine material or tailings conveyed from the viner.

Another object is to provide pea separating apparatus of this character which can be manufactured at low cost.

A further object is to provide a pea separating device which can readily be applied to the tailings conveyers or elevators of existing machines.

The invention further consists in the several features hereinafter described and claimed.

In the accompanying drawing, illustrating one embodiment of the invention,

Fig. 1 is a longitudinal sectional elevation of the discharge end of a viner provided with pea separating apparatus of the invention;

Fig. 2 is a detail sectional elevation of the apparatus, a pivoted finger thereof being shown in different operative positions by full and dotted lines;

Fig. 3 is a transverse sectional elevation taken generally along the line 3—3 of Fig. 1;

Fig. 4 is a detail view of a bracket for the apparatus;

Fig. 5 is a detail view of a fingered rock-shaft of the apparatus, parts being broken away and parts being shown in section, and Fig. 6 is a detail sectional view taken along the line 6—6 of Fig. 3.

In the drawing, 10 designates a viner frame in which is mounted a rotatable beater drum 11 surrounded by a rotatable screen drum 12 as usual for effecting the hulling of the peas. Beneath the screen drum is the usual inclined separating apron 13 onto which is deposited the loose peas and chaff falling through the openings of the screen drum.

A chute 14 at the discharge end of the viner delivers the threshed vine material or tailings onto a conveyer which is preferably in the form of an elevator 15 for stacking the tailings. The elevator comprises an inclined trough-like frame formed by parallel side members 16 connected by a floor 17. Conveyer chains 18 are slidable along the floor adjacent to the side members 16 and are connected at intervals by cross slats 19 which slide along the floor. At the upper or outer end of the elevator frame the chains pass over sprocket wheels 20, one being shown, driven as by means of a power transmission chain 21. At the lower end of the elevator frame the chains pass over flanged idler rollers 22 beneath the chute 14. The return run of the conveyer passes along a chute-forming trough 23 extending beneath the lower portion of the inclined elevator frame. Near the lower portion of the elevator frame, the floor thereof is constructed to form a sieve, as by means of spaced longitudinally extending bars 24. Loose peas and chaff fall through the sieve onto the trough 23 and are discharged from the lower or inner end of the trough onto a belt-type chaffer 25 which extends beneath the discharge end of the trough. The peas deposited on the chaffer roll down the chaffer belt or apron and drop in a receptacle 26 which is emptied at intervals, while the chaff passes upwardly along the chaffer belt and is discharged.

The viner construction thus far described is of the usual type. Although the sieve bottom of the elevator permitted the escape of some peas from the vine tailings conducted along the elevator, it was found that a considerable number of threshed peas still passed out with the tailings, and that this loss was increased when the vines were green, juicy and wet, or when the viner was overfed, or when operating on varieties of peas which were difficult to thresh.

The purpose of the present invention is to save most of the loose peas which would otherwise be lost. To this end means are provided for turning over, disentangling and otherwise disturbing the bunched or matted vines as they pass along the elevator, so as to effect the release of the peas from the vines and permit the escape of the peas through the apertured bottom of the elevator frame. In the preferred embodiment of the invention, suitably mounted yieldable fingers 27 extend downwardly into the path of the vines conducted along the elevator and form a comb-like or rake-like structure spaced above the apertured bottom of the elevator. The fingers 27 have hooked lower free ends 28 projecting toward the receiving end of the elevator and normally spaced a short distance above the path of the upper edges of the conveyer slats 19. The upper ends of the fingers are preferably carried on a rock-shaft 29 which extends transversely above the elevator frame and is rotatably mounted in brackets 30 and 31 secured to the outer faces of the side members 16 of the elevator frame, the brackets having longitudinal slots 32 for attaching bolts 33 so as to permit vertical adjustment of the brackets. Each finger 27 preferably consists of a length of spring wire having a coiled upper end 34 surrounding the rock-shaft, the wire having a terminal eye 35 secured to the rock-shaft by a bolt 36.

A coiled torsion spring 37 surrounds an end portion of the rock-shaft and has one end anchored in the bracket 30 and the other end in a collar 38 adjustably secured to the rock-shaft. The torsion spring urges the swingably mounted fingers 27 in a direction against the travel of the vines on the elevator and forms a return spring for the fingers when they are deflected. The fingers normally extend at a steep angle in a direction approximately at right angles to the upper run of the elevator, as shown in full lines in Fig. 2, and are urged to this position by the torsion spring. This position of the spring-urged fingers is determined by a stop member 39, Figs. 3 and 6, which is carried on a collar 40 adjustably secured to the rock-shaft, and which is engageable with a stop abutment 41 on the bracket 31. The torsion spring 37 is adjusted so that the lower ends of the fingers will yield to the oncoming vines under a light pressure, usually about three or four pounds, the swingable fingers being deflectable rearwardly and upwardly, and the spring pressure on the fingers increasing with the deflection. Instead of using a torsion spring for yieldably resisting rotation of the rock-shaft, it is obvious that counterweight means may be employed. It is also obvious that each spring finger may have sufficient spring action to permit individual yielding without requiring the yielding of the finger-supporting means.

The fingers are suitably spaced along the rock-shaft and if desired the fingers near the end portions of the shaft may have a closer spacing than those at the middle of the shaft, as it is usually found that the bunched vines tend to travel near the sides of the trough-like elevator frame.

In operation, the vine material or straw is discharged from the viner chute 14 onto the lower portion of the elevator frame and is conducted upwardly along this frame by the slats 19 of the conveyer. When a bunch of vines reaches one or more of the swingably mounted fingers 27 the hooked lower ends of the fingers engage the top portion of the bunch and temporarily retard or restrain the movement of this top portion, the finger ends being swung rearwardly and upwardly by the bunch against the resistance of the torsion spring. The lower portion of the vine bunch, however, continues to be impelled by the conveyer slats, with the result that the bunch is turned or rolled over so as to release the loose peas lodged in the bunch and permit them to escape through the slotted bottom of the elevator frame. During the travel of the bunch the swingable fingers move with it, as to the lifted dotted line position of Fig. 2, thereupon being released from the turned-over bunch and returning under spring pressure with a quick or whipping action to the full line position of Fig. 2. The released bunch of vines then continues its upward travel along the elevator and is finally discharged. The fingers also act to disentangle the bunch to some extent, thus releasing peas from the interior of the bunch. The hooked ends of the swingably mounted fingers insure a good purchase on the oncoming vines, but these ends are readily released from the vines after the fingers are angularly displaced and lifted by the vines.

When operating on different varieties of vines, it may be desirable to adjust the height of the hooked finger ends above the conveyer, this being permitted by the adjustably mounted brackets 30 and 31.

It is obvious that two or more of the fingered rockshafts may be mounted at longitudinally spaced regions of the elevator, so that they will operate successively on the vines conducted along the elevator.

What I claim as new and desire to secure by Letters Patent is:

1. In a separator for peas and the like, the combination of conveying means for supporting and conducting threshed vines and apertured to permit the escape of loose peas, said means including an impelling element engageable with the vines, a plurality of laterally spaced vine-engaging fingers normally projecting downwardly at a steep angle into the path of the vines for disturbing bunches of the vines to liberate loose peas therefrom, said fingers having lower free ends spaced above the path of said impelling element, means for swingably mounting said fingers comprising a rockshaft extending transversely above said conveying means, and means distinct from said fingers for rotatably urging said rockshaft in one direction to yieldably resist the pressure of the vines.

2. In a separator for peas and the like, the combination of conveying means for supporting and conducting threshed vines and apertured to permit the escape of loose peas, said means including an impelling element engageable with the vines, a plurality of laterally spaced resilient vine-engaging fingers normally projecting downwardly at a steep angle into the path of the vines for disturbing bunches of the vines to liberate loose peas therefrom, the lower free ends of said fingers being spaced above the path of said impelling element, means for swingably mounting said fingers comprising a rock-shaft extending transversely above said conveying means, and means for rotatably urging said rock-shaft in one direction to yieldably resist the pressure of the vines, said fingers being swingable rearwardly under the pressure of the moving vines.

3. In a separator for peas and the like, the combination of conveying means for supporting and conducting threshed vines and apertured to permit the escape of loose peas, said means including an impelling element engageable with the vines, and a plurality of fingers spaced transversely of the conveying means and normally projecting downwardly at a steep angle into the path of the vines for disturbing bunches of the vines to liberate loose peas therefrom, said fingers being formed and arranged to be independently yieldable rearwardly and upwardly under the pressure of the vines, and having lower free ends spaced above the path of said impelling element.

4. In a separator for peas and the like, the combination of conveying means for supporting and conducting threshed vines and apertured to permit the escape of loose peas, said means including an impelling element engageable with the vines, and a plurality of fingers spaced transversely of the conveying means and normally projecting downwardly at a steep angle into the path of the vines for disturbing bunches of the vines to liberate loose peas therefrom, said fingers being formed and arranged to be independently yieldable rearwardly and upwardly under the pressure of the vines and having lower free ends spaced above the path of said impelling element, said finger ends being hooked in a forward direction to face and engage the oncoming vines.

5. In a separator for peas and the like, the combination of conveying means for supporting and conducting threshed vines and apertured to permit the escape of loose peas, said means including an impelling element engageable with the vines, a plurality of vine-engaging fingers of substantial length transversely spaced above said conveying means and normally projecting downwardly into the path of the vines approximately at right angles to said path for disturbing bunches of the vines to liberate loose peas therefrom, the lower free ends of the fingers being spaced above the path of said impelling element, means for swingably mounting said fingers, and spring means for urging said fingers to swing in one direction to yieldably resist the pressure of the vines, said fingers being yieldable rearwardly and upwardly under the pressure of the vines.

FRANK HAMACHEK, JR.